United States Patent [19]

Janssen et al.

[11] Patent Number: 5,752,681

[45] Date of Patent: May 19, 1998

[54] PIPE AND CABLE CLAMP WITH BASE PART AND RECEIVING STRAP

[75] Inventors: Rupert Janssen, Meiningen; Markus Fröwis, Frastanz, both of Austria; Luc Guillon, Sax, Switzerland

[73] Assignee: Hilti Aktiengesellschaft, Fürstentum, Liechtenstein

[21] Appl. No.: 527,907

[22] Filed: Sep. 14, 1995

[30] Foreign Application Priority Data

Sep. 15, 1994 [DE] Germany ............... 4 32 781.1

[51] Int. Cl.[6] ............................................. F16L 3/08
[52] U.S. Cl. ...................... 248/65; 248/68.1; 248/74.2; 248/909
[58] Field of Search ..................... 248/65, 68.1, 71, 248/74.2, 909, 74.5

[56] References Cited

U.S. PATENT DOCUMENTS

| | | | |
|---|---|---|---|
| 1,476,836 | 12/1923 | Pleister | 248/909 X |
| 2,366,456 | 1/1945 | Pheazey | 248/74.2 X |
| 2,712,917 | 7/1955 | Flora et al. | 248/71 X |
| 2,885,168 | 5/1959 | Silverman | 248/71 |
| 2,961,210 | 11/1960 | Pfaff et al. | 248/71 X |
| 3,216,685 | 11/1965 | Raymond | 248/74.2 |
| 3,491,972 | 1/1970 | Townshend | 248/71 |
| 4,370,082 | 1/1983 | Sundberg | 248/71 X |
| 5,411,228 | 5/1995 | Morawa et al. | 248/71 X |
| 5,496,005 | 3/1996 | Dieringer | 248/71 X |

FOREIGN PATENT DOCUMENTS 112894  9/1968  Norway ............... 248/65

OTHER PUBLICATIONS

Taiwan Publication No. 243969.
Taiwan Publication No. 191523.

*Primary Examiner*—Ramon O. Ramirez
*Attorney, Agent, or Firm*—Anderson Kill & Olick, P.C.

[57] ABSTRACT

A pipe and cable clamp is formed of a base part (5) and a receiving strap (6). To assure that a pipe or cable positioned in a receiving space between the clamp and a surface of a structural component is adequately retained, where the receiving strap forms two receiving spaces (8, 9) located laterally from the base part, a spring arm (7) is located in the receiving space (8) closer to the base part (5) in the event a pipe or cable of larger diameter is located in the receiving space more remote from the base part. The spring arm (7) extends outwardly from the base part (5) and projects in an unloaded state into the receiving space (8) closer to the base part (5).

3 Claims, 1 Drawing Sheet

5,752,681

PIPE AND CABLE CLAMP WITH BASE PART AND RECEIVING STRAP

BACKGROUND OF THE INVENTION

The present invention is directed to a pipe and cable clamp with a base part for fixing the clamp to a surface of a structural component and at least one receiving strap extending outwardly from the base part and forming at least one receiving space for a pipe or cable.

Pipe and cable clamps of the above type serve for attaching pipes and cables to a structure component. While the pipes are used for a wide variety of installations, cables can be electric cables of the like.

Pipes and the cables are available in different diameters and this feature must be taken into account when attaching the pipes and the cables. Since the pipe and cable clamps are formed, as a rule, of elastic material, such as plastics material, some variations in diameter can be accommodated by their elasticity. If the elasticity is no longer sufficient to compensate for differences in diameter, there are particular economic disadvantages in that different tools have to be made available for manufacture and, in addition, storage management involves considerable space at the facilities of the manufacturer and of the user.

To eliminate the disadvantages resulting from variations in diameter, a pipe and cable clamp is known in DE-PS 26 33 528 where the clamp can be attached at different inclinations to the component surface. Accordingly, a base part, from which a receiving strap extends, has an inclined contact surface. Because of the inclined contact surface, the pipe and cable clamp can be fixed to the component in different inclined positions. In addition, the elasticity of the receiving strap is also made use of in this known pipe and cable clamp.

Problems develop when this known pipe and cable clamp is attached to a component, since in most cases there is no stable position due to the inclined contact surface. As a result, inadequate attachment can occur, by driving attachment elements, in the form of nails or the like, obliquely into the component, whereby insufficient retention occurs.

In addition, the personnel installing such clamps must have considerable experience for providing clearly defined contact position during assembly.

SUMMARY OF THE INVENTION

Therefore, the primary object of the present invention is to provide a pipe and cable clamp capable of being attached to the surface of a structural component in a simple manner and being suitable for attaching pipes and cables of different diameters.

In accordance with the present invention, a spring arm projects outwardly from the base part of the pipe and cable clamp and it can be flexed or bent in a plane perpendicular to a central axis of the receiving space defined by the receiving strap with the arm projecting into the receiving space in its unloaded state.

When attaching pipes and cables of larger diameter, the elasticity of the receiving strap is mainly used, by deforming the strap and bending it relative to the base part, so that the receiving space is enlarged. Such deformation takes place as the base portion is fixed to the surface of the structural component, wherein due to the elasticity of the material used for the pipe and cable clamps, such as plastics material, the pipes and cables are adequately tensioned or clamped against the structural component. If the diameter is reduced, the spring arm of the present invention effects a similar capability due to the spacing of the free end of the receiving strap from the surface of the structural component. The spring arm clamps the pipe or cable to be attached, significantly securing it against the structural component if the free end of the receiving strap is spaced relative to the structure component. This permits adaptation of the use of the spring clamp with pipes and cables of different diameters.

Appropriately, the spring arm is arcuately shaped. In particular, it is advantageous when attaching a pipe or cable that the spring arm extends for 50 to 80% of the arcuate dimension of the part of the receiving strap forming the receiving space involved. This assures that the pipe or cable to be attached is sufficiently clamped or tensioned against the surface of the structural component.

As far as the shape for distribution is concerned, it is advisable if the spring arm is formed in a recess of a part of the receiving strap forming the receiving space for the pipe or cable.

Retention of the pipes or cables, particularly in a direction parallel to the central axis of the receiving space, can be improved by a positive locking effect. Such a positive locking effect can be provided by high surface pressures achieved by the spring arm having a rib projecting into the receiving space along at least a portion of its length with the rib extending in a plane located perpendicularly to the central axis of the receiving space.

During installation, it frequently occurs that several pipes or cables located next to one another must be fastened to the structural component. For this purpose, pipe and cable clamps are known which form several adjoining receiving spaces, in particular two, extending in a direction outwardly from a base part. In this preferred utilization the pipe and cable clamps with two receiving spaces, there is a danger that the pipe or cable located adjacent the base part is not adequately clamped against the structural component, if the more outwardly located pipe or cable has too greater a diameter. To deal with this frequently experienced disadvantage, it is proposed in another embodiment of the invention to provide two side-by-side receiving spaces extending from the base part with the spring arm projecting into the receiving space adjacent to the base part. With the spring arm projecting into the receiving space adjacent to the base part, adequate clamping of the pipe or cable extending through such receiving space is assured, even if the more outwardly located pipe or cable is not adequately matched with respect to diameter.

DETAILED DESCRIPTION OF THE INVENTION

Figure 1:
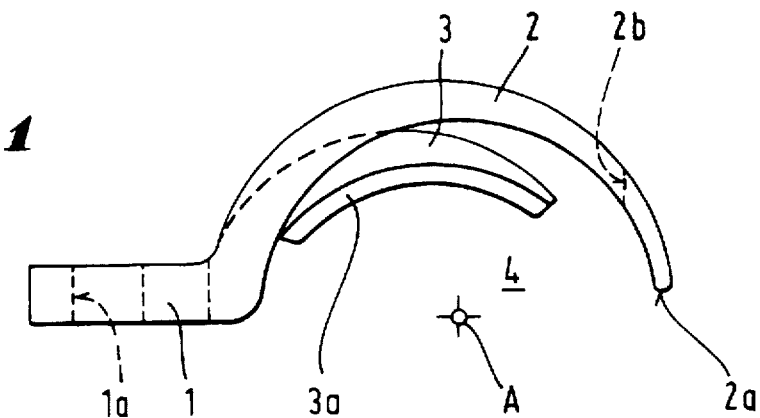
FIG. 1 is a side elevational view of a pipe and cable clamp embodying the present invention.
Figure 2:
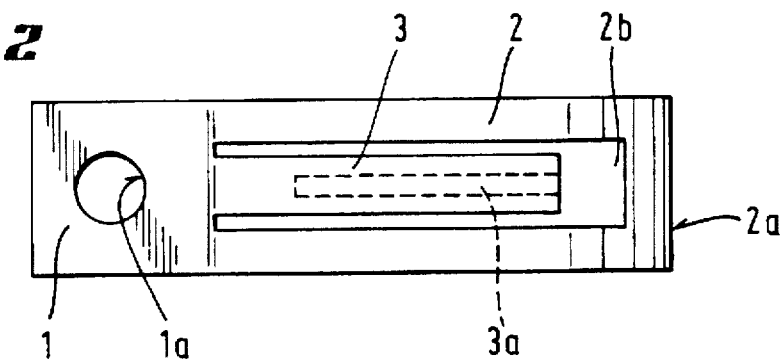
FIG. 2 is a plan view of the pipe and cable clamp shown in FIG. 1.

In FIGS. 1 and 2 a pipe and cable clamp is shown having a base part 1 and a receiving strap 2. A bore a is located in the base part 1 for attaching the clamp to the surface of a structural component, not shown, whereby the bore serves for the passage of a fastening element in the form of a nail, dowel or the like. In place of a fastening element, attachment can be effected by bonding, welding or by a positively locked connection in a appropriate recess in the structural component.

As FIG. 1 illustrates, the receiving strap 2 encloses a receiving space 4 having a central axis A passing therethrough. The receiving space is bounded on one side by the base part 1 on the other side by the free end 2a of the receiving strap 2, and, in addition, by the surface of the structural component, not shown. A spring arm 3 extends outwardly from the base part 1 in the same manner as the receiving strap 2, however, it extends, in an unloaded state, into the receiving space or relative to the receiving strap. The spring arm 3 has a rib 3a extending in the direction outwardly away from the base part 2 with the rib extending into the receiving space towards the central axis with the rib located in a plane extending perpendicularly to the central axis A.

FIG. 2 shows the spring arm 3 located in a recess or cutout in the receiving strap 2. As illustrated, the spring arm 3, the receiving strap 2 and the base part 1 are formed of a single piece of material. Further, the rib 3a is shown in phanton extending from the end of the spring arm 3 more remote from the base part 1 towards but spaced from the base part.

Figure 3:
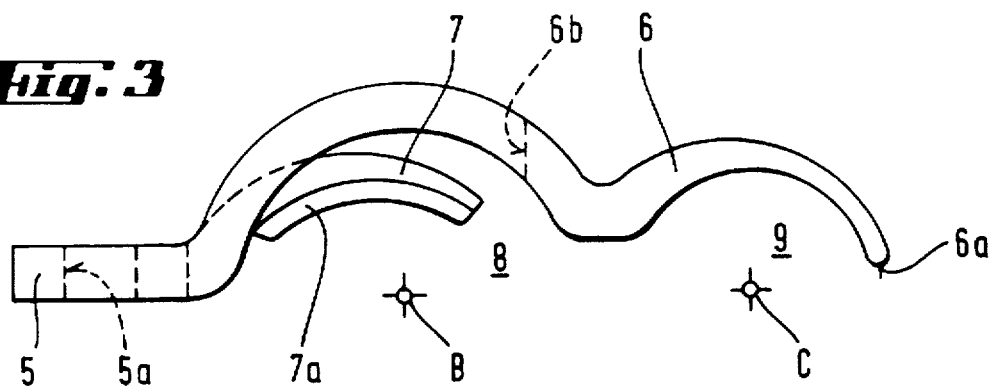
FIG. 3 is a side view of another embodiment of the pipe and cable clamp incorporating the present invention.

In FIG. 3, a pipe and cable clamp is shown having a base part 5 and a receiving strap 6 extending outwardly from the base part. Receiving strap 6 has a free end 6a based outwardly from the base part and is shaped in such a way that two side-by-side receiving spaces 8, 9 are formed. A central axis B extends through the receiving space perpendicularly to the plane containing the receiving strap. Similarly, a central axis C is located in the receiving space 9 extending parallel to the central axis B and perpendicularly of the plane containing the receiving strap.

A through bore 5a is located in the base part 5 for fixing the base part to a structural component surface in the manner described above. Further, a spring arm 7 projects from the base part 5 within a cut out or recess 6b in the receiving strap 6 so that it projects in the unloaded state into the receiving space 8. A rib 7a is formed on the spring arm 7 and extends into the receiving space 8 with the rib extending in a plane perpendicular to the central axis B.

The cable clamp according to the embodiments described above, is formed of an elastic material, and a plastics material is particularly suitable for the clamp.

While specific embodiments of the invention have been shown and described in detail to illustrate the inventive principles, it will be understood that the invention may be embodied otherwise without departing from such principles.

We claim:

1. A pipe and cable clamp comprising a single base part (1, 5) arranged to be fixed to a surface of a structural component with the surface forming a first plane, and a receiving strap (2, 6) secured to and extending laterally outwardly from one side of said base part and spaced outwardly from the first plane, said receiving strap having a first end secured to the one side of said base part and a free second end spaced outwardly from said first end, said receiving strap (2, 6) forming at least one receiving space (4, 8, 9) for pipes and cables located between the receiving strap and the first plane and said receiving space having a central axis (A) extending through said receiving space and parallel to said first plane, said receiving strap being elastically deformable relative to said first plane whereby said receiving space being enlargeable, said receiving strap having a cutout extending from said base part to adjacent said free second end, a spring arm secured to and extending outwardly from said base part in the cutout of said receiving strap and in spaced relation to said receiving strap, said spring arm being arcuately shaped and flexible in a second plane extending perpendicularly to said first plane and central axis and in an unloaded state said spring arm projects into said receiving space spaced between said receiving strap and said first plane, and said arcuately shaped spring arm having a concave surface facing said first plane, said receiving strap is arcuately shaped between the first and second end thereof, and said spring arm (3, 7) extends along 50 to 80% of the arc of the receiving strap (2, 6) forming a receiving space (4, 8) adjacent to said base part (1, 5).

2. Pipe and cable clamp, as set forth in claim 1, wherein said spring arm (3, 7) comprises a rib (3a, 7a) projecting into said receiving space (4a) toward said first plane and extending along at least a portion of a length of said spring arm extending from a free end thereof towards said base part and said rib being located in a plane perpendicular to the central axis (A, B) and in said receiving space (4, 8) located adjacent said base part.

3. A pipe and cable clamp comprising a single base part (1, 5) arranged to be fixed to a surface of a structural component with the surface forming a first plane, and a receiving strap (2, 6) secured to and extending laterally outwardly from one side of said base part and spaced outwardly from the first plane, said receiving strap having a first end secured to the one side of said base part and a free second end spaced outwardly from said first end, said receiving strap (2, 6) forming at least one receiving space (4, 8, 9) for pipes and cables located between the receiving strap and the first plane and said receiving space having a central axis (A) extending through said receiving space and parallel to said first plane, said receiving strap being elastically deformable relative to said first plane whereby said receiving space being enlargeable, said receiving strap having a cutout extending from said base part to adjacent said free second end, a spring arm secured to and extending outwardly from said base part in the cutout of said receiving strap and in spaced relation to said receiving strap, said spring arm being arcuately shaped and flexible in a second plane extending perpendicularly to said first plane and central axis and in an unloaded state said spring arm projects into said receiving space spaced between said receiving strap and said first plane, and said arcuately shaped spring arm having a concave surface facing said first plane, said receiving strap is arcuately shaped between the first and second end thereof, and said spring arm (3, 7) extends along 50 to 80% of the arc of the receiving strap (2, 6) forming a receiving space (4, 8) adjacent to said base part (1, 5), said receiving strap forms two side-by-side receiving spaces (8, 9) extending outwardly from said base part (5) and said spring arm (7) extends into said receiving space (8) adjacent to said base part (5).

* * * * *

UNITED STATES PATENT AND TRADEMARK OFFICE
CERTIFICATE OF CORRECTION

PATENT NO. : 5,752,681
DATED : May 19, 1998
INVENTOR(S) : Ruppert Janssen, et. al.

It is certified that error appears in the above-indentified patent and that said Letters Patent is hereby corrected as shown below:

Title page, item [30], under Foreign Application Priority Data should read --
Sept. 15, 1994  [DE] Germany.......... 44 32 781 --.

Signed and Sealed this

Twenty-eighth Day of July, 1998

*Attest:*

BRUCE LEHMAN

*Attesting Officer*    *Commissioner of Patents and Trademarks*